United States Patent
Zinn et al.

(10) Patent No.: US 6,878,292 B2
(45) Date of Patent: Apr. 12, 2005

(54) FILTER DEVICE

(75) Inventors: Nils Zinn, Moheda (SE); Björn Hedin, Hjortsberga (SE); Lars Svensson, Alvesta (SE)

(73) Assignee: O. Malmvist AB, Alvesta (SE)

( * ) Notice: Subject to any disclaimer, the term of this patent is extended or adjusted under 35 U.S.C. 154(b) by 40 days.

(21) Appl. No.: 10/391,019

(22) Filed: Mar. 19, 2003

(65) Prior Publication Data

US 2003/0178376 A1 Sep. 25, 2003

(30) Foreign Application Priority Data

Mar. 21, 2002 (SE) .......................................... 0200859-7

(51) Int. Cl.[7] .............................................. B01D 37/00
(52) U.S. Cl. ....................... 210/769; 210/791; 210/797; 210/220; 210/409; 210/488
(58) Field of Search ................... 210/769, 770, 210/771, 791, 797, 798, 220, 248, 409, 411, 416.1, 488

(56) References Cited

U.S. PATENT DOCUMENTS 1,992,101 A * 2/1935 Stuart ....................... 210/323.2

* cited by examiner

Primary Examiner—Robert James Popovics
(74) Attorney, Agent, or Firm—Harness, Dickey & Pierce, P.L.C.

(57) ABSTRACT

A filter device has a filter housing, which is intended to contain a liquid to be filtered and in which at least one filter rod is arranged. The filter rod is composed of annular washers, which are arranged in a stack on a core formed with openings and which are so closely packed that particles in the liquid adhere to the periphery of the washers when the liquid is caused, from the outside, to pass between the washers into the core for filtration. The filter device has a gas supply member, which is intended to inject a gas flow into the liquid in the filter housing.

In a method of cleaning a filter rod for filtering a particle-containing liquid in such a filter device, a gas flow is injected into the liquid in the filter housing so that a particle sock, which is formed on said filter rod of particles in the liquid, is detached from the filter rod and disintegrated.

5 Claims, 3 Drawing Sheets

FILTER DEVICE

FIELD OF THE INVENTION

The present invention relates to a filter device having a filter housing, which is intended to contain a liquid to be filtered and in which at least one filter rod is arranged, said filter rod being composed of annular washers, which are arranged in a stack on a core formed with openings and which are so closely packed that particles in the liquid adhere to the periphery of the washers when the liquid is caused, from the outside, to pass between the washers for filtration. The invention also relates to a method of cleaning a filter rod in a filter device of said type.

TECHNICAL BACKGROUND

It is known to filter out particles from dirty liquid by means of such a filter device, which is part of a self-cleaning filter installation. At certain intervals, the length of which depends primarily on the abundance of particles in the liquid, the particles which have adhered to the filter washers during the filtration are removed by back flushing of the filter rods. The back flushing occurs, after discharge of the dirty liquid, by compressed air being injected or by filtered clean liquid being pressed out of the core of the filter rods between the filter washers, so that the particles are detached from the outside of the filter rods and can be led away from the filter housing by discharging the liquid.

Such a filter installation is used, for example, in various types of machining operations, such as electrical discharge machining, grinding, polishing, honing and turning, in which particles are detached, to filter out these particles from the liquid that is used as cooling and/or lubricant liquid in the operation.

However, in some types of machining, in particular grinding, barbed particles form which tend to stick to each other and build up so-called socks round the filter rods. As these socks are permeable, they are unaffected by the back flushing and remain on the filter rods, which is a problem since the socks can thus continue to grow when continuing the filtration.

The filter rods are arranged in filter housings, which are closed containers integrated into the filter installation, and to take care of these socks the operator must thus stop the filtration, open the filter housings and lift up the filter rods, which results in a time-consuming stoppage. If the socks are not taken care of, they will finally grow so much as to destroy the filter rods or fill the housing with sludge, which entails a more serious stoppage that is more difficult to deal with.

SUMMARY OF THE INVENTION

The object of the invention is to obviate the above problem and to provide a quick and easy method of cleaning filter rods in a filter device of the type stated by way of introduction and a filter device, in which said method is used.

According to the invention, this object is achieved by means of a method, which is characterized in that a gas flow is injected into the liquid in the filter housing so that a particle sock, which is formed on said filter rod of particles in the liquid, is detached from the filter rod and disintegrated.

This object is also achieved according to the invention by means of a filter device, which is characterized by a gas supply means, which is intended to inject a gas flow into the liquid in the filter housing so that a particle sock, which is formed on said filter rod of particles in the liquid, is detached from the filter rod and disintegrated.

The gas supply means is preferably a connection at the bottom of the filter housing, the gas flow being injected into the filter housing at the bottom thereof, so that a gas flow directed from the bottom upwards is formed, which gas flow passes along the filter rods from below upwards and tears off the particle sock.

From considerations of space, the gas supply means can also be a pipe, which extends into the filter housing down to its bottom, where the pipe ends, so that the gas flow contacts the liquid in the housing only when reaching the bottom of the filter housing, where it generates bubbles that rise along the filter rods.

The liquid containing particles is suitably drained from the filter housing after the gas flow has been injected and the particle sock has been detached from the filter rod and disintegrated so that the particles are removed from the filter housing.

It is further conceivable to use the method according to the invention in a filter device of prior-art type, in which the gas supply means consists of the filter rods and the gas flow is supplied to the filter housing through the core of the filter rod.

Preferably, the gas flow is injected in the form of compressed air, since it is cheap compared to other gases and an air compressor is in most cases already provided in connection with a filter device.

BRIEF DESCRIPTION OF THE DRAWINGS

In the following, the invention will be described in more detail by way of preferred, but not limiting, embodiments and with reference to the accompanying drawings.

DESCRIPTION OF PREFERRED EMBODIMENTS

Figure 1:
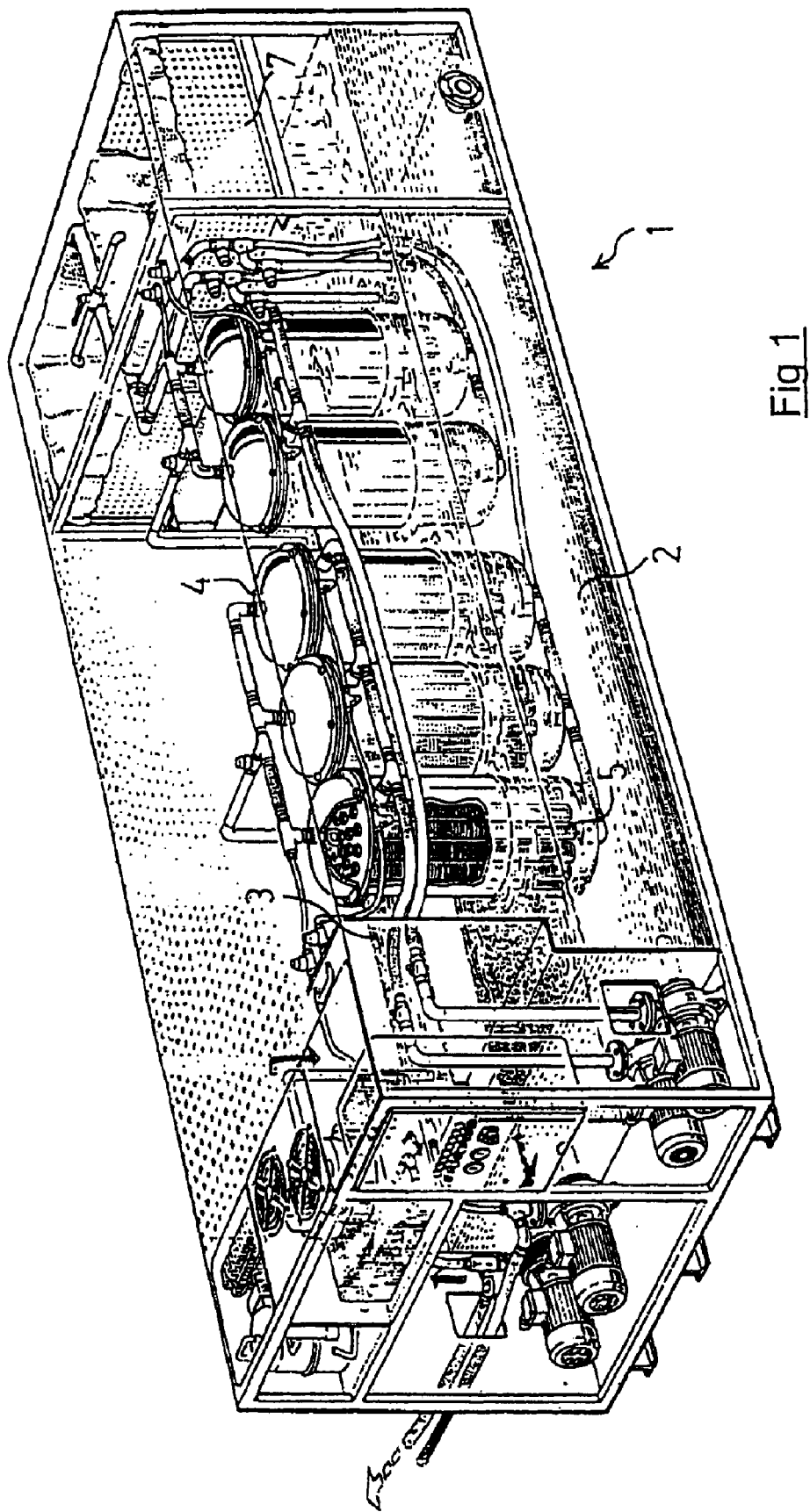
FIG. 1 is a perspective view with cut-away portions and shows a prior-art filter device of the type stated by way of introduction.

FIG. 1 shows a filter installation 1, which is used for filtering, for example, cooling oil and/or lubricant used, for example, in installations for grinding, turning, polishing, honing or electrical discharge machining operations. In such an installation, the oil is pumped from a return oil tank 2 to filter housings 4, in which it is filtered, and is then passed on to a clean oil tank 3.

A filter device comprises a filter housing 4, in which a plurality of filter rods 5 are placed, which are composed of annular paper washers, which are closely packed and arranged in a stack on a slotted core. They are compressed between two biased plates, one at each end of the rod. The core forms an outlet for filtered oil when filtering and an inlet for compressed air when back flushing.

Figure 2:
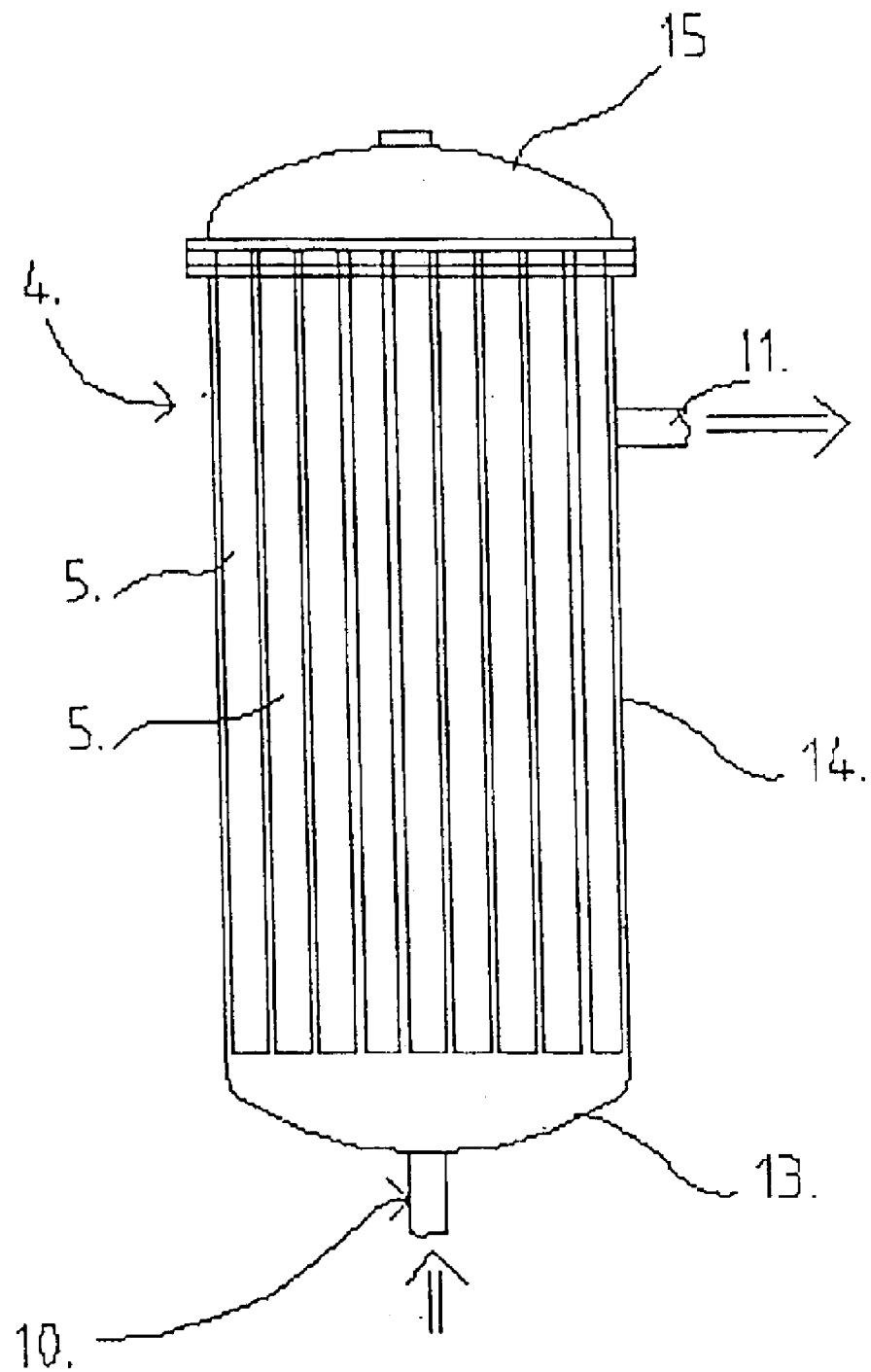
FIG. 2 is a side view with cut-away portions and shows a filter housing according to the invention with filter rods and a connection for compressed air at the bottom.
Figure 3:
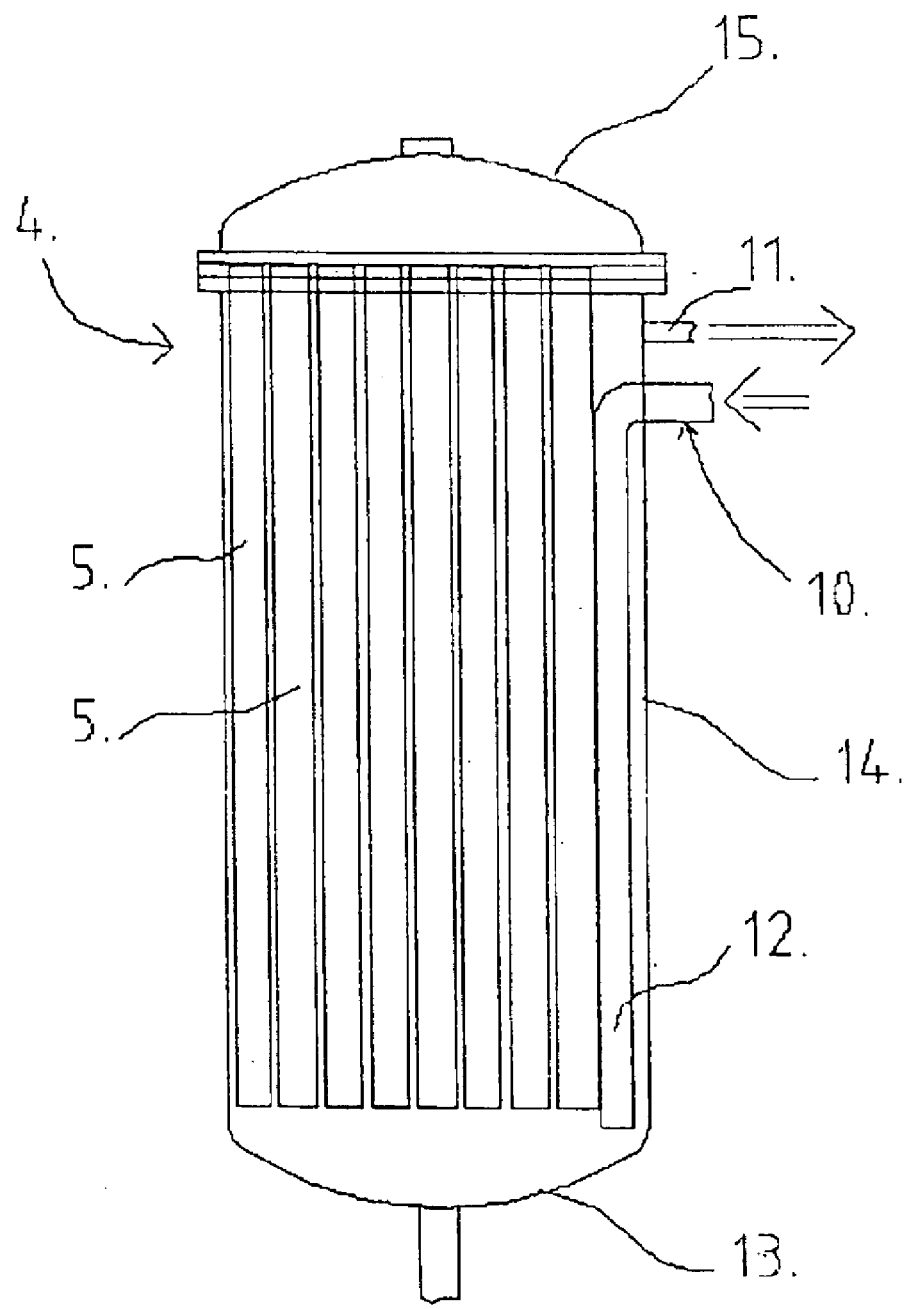
FIG. 3 is a side view with cut-away portions and shows an alternative embodiment of the filter device according to the invention.

A filter housing 4 in a filter device according to the invention has, as shown in FIGS. 2 and 3, a compressed air inlet 10, which constitutes a gas supply means.

When filtering, the filter housings 4 are filled with dirty oil which contains particles that are to be filtered out and which is pressed in between the washers of each filter rod to the respective cores, from which the cleaned oil is passed on to the clean oil tank 3 while the particles exceeding 1 μm adhere to the outside of the filter rods 5.

The pumping of oil is interrupted at certain intervals, the length of which depends on the type of machining, the material and the particle form, after which such a small amount of oil is discharged from the filter housing 4 that the filter rods are kept substantially immersed in oil. Subsequently, a gas flow is directed from the bottom 13 upwards in the filter housing by the gas supply means 10. When compressed gas is injected into the oil, a large amount of gas bubbles form, which rise, pass between the filter rods 5 and tear off particle socks formed on the outside of the filter rods. The gas is preferably air, but also other gases can be used provided that they do not react with the oil which is to be filtered. A suitable pressure for generating bubbles is 3–6 bar, preferably 4–4.5 bar. The gas is then discharged through a compressed air outlet 11.

In a preferred embodiment, the gas supply means 10 is a compressed air connection at the bottom 13 of the housing. In alternative embodiments, compressed air can also be supplied through the wall 14 or the top 15 of the filter housing. One or more pipes 12 extending, respectively, from the wall 14 and the top 15 of the filter housing are, in these alternative embodiments, arranged to direct the gas flow to the bottom 13 of the filter housing so that the bubbles are generated below the filter rods 5 or in the lower portion thereof.

It is further conceivable to supply compressed air from inside, i.e. from the core of the rods, in the same way as when back flushing, but with the liquid still in the filter housing, in which case the pressure should be about 3 bar at most.

After the bubbles generated with the aid of the gas supply means have removed the particle socks formed on the filter rods, all the dirty oil is drained from the filter housings and passed with the particles to a perforated container 7, in which the particles are allowed to settle.

The filter rods are preferably back flushed in conventional manner by means of compressed air at the same time as the oil is drained from the filter housings, but it is, of course, also possible to drain the oil first and then back flush.

After back flushing, dirty oil is again pumped into the filter housings 4 from the return oil tank 2. The entire filtering process of the method according to the invention, including pumping of oil, formation of bubbles and back flushing, can thus be automatic without requiring any intervention of the operator such as monitoring, cleaning or changing of the filter rods.

What we claim and desire to secure by Letters Patent is:

1. A method of cleaning a filter rod for filtering a particle-containing liquid in a filter device having a filter housing, which is intended to contain the liquid to be filtered and in which at least one filter rod is arranged, said filter rod being composed of annular washers, which are arranged in a stack on a core formed with openings and which are so closely packed that particles in the liquid adhere to the periphery of the washers when the liquid is caused, from the outside, to pass between the washers for filtration, wherein a gas flow is injected into the liquid in the filter housing so that a particle sock, which is formed on said filter rod of particles in the liquid, is detached from the filter rod and disintegrated.

2. A method as claimed in claim 1, in which the gas flow is injected into the filter housing at the bottom thereof.

3. A method as claimed in claim 1, in which the gas flow is supplied to the filter housing through the core of the filter rod.

4. A method as claimed in any one of claims 1–3, in which the liquid with particles is drained from the filter housing after the gas flow has been injected and the particle sock has been detached from the filter rod and disintegrated.

5. A method as claimed in claim 1, in which the gas flow is injected in the form of compressed air.

* * * * *